(12) United States Patent  
Fullerton et al.

(10) Patent No.: US 9,965,243 B2  
(45) Date of Patent: *May 8, 2018

(54) PLAYBACK EXPANSION

(71) Applicant: Sonos, Inc., Santa Barbara, CA (US)

(72) Inventors: Benjamin Fullerton, Oakland, CA (US); Ingve Holmung, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/078,300

(22) Filed: Mar. 23, 2016

(65) Prior Publication Data

US 2016/0246567 A1    Aug. 25, 2016

Related U.S. Application Data

(63) Continuation of application No. 14/631,723, filed on Feb. 25, 2015, now Pat. No. 9,330,096.

(51) Int. Cl.
*G06F 17/00* (2006.01)
*G06F 3/16* (2006.01)
(Continued)

(52) U.S. Cl.
CPC ............. *G06F 3/165* (2013.01); *G05B 15/02* (2013.01); *G11B 27/10* (2013.01); *H04L 7/00* (2013.01); *H04N 21/43615* (2013.01); *H04N 21/4524* (2013.01); *H04N 21/8113* (2013.01); *G11B 20/10* (2013.01); *G11B 23/049* (2013.01);
(Continued)

(58) Field of Classification Search
None
See application file for complete search history.

(56) References Cited

U.S. PATENT DOCUMENTS

| 4,696,037 A | 9/1987 | Fierens |
| 5,440,644 A | 8/1995 | Farinelli et al. |

(Continued)

FOREIGN PATENT DOCUMENTS

| EP | 1389853 A1 | 2/2004 |
| EP | 2180727 A2 | 4/2010 |

(Continued)

OTHER PUBLICATIONS

"AudioTron Quick Start Guide, Version 1.0", Voyetra Turtle Beach, Inc., Mar. 2001, 24 pages.

(Continued)

*Primary Examiner* — Tan X Dinh
(74) *Attorney, Agent, or Firm* — McDonnell Boehnen Hulbert & Berghoff LLP

(57) ABSTRACT

Examples described herein involve expanding playback of a media item from one playback device to another playback device. In an example implementation, while a first playback device is part of a first zone, the first playback device identifies that a second playback device has moved to a location that is within a given physical proximity of the first playback device. The first playback device determines that playback is to be expanded from the second playback device, and responsively, joins the a second zone that comprises the second playback device and initiates playback of media in synchrony with the second playback device.

21 Claims, 7 Drawing Sheets

(51) Int. Cl.
*H04L 7/00* (2006.01)
*H04N 21/436* (2011.01)
*H04N 21/45* (2011.01)
*H04N 21/81* (2011.01)
*G05B 15/02* (2006.01)
*G11B 27/10* (2006.01)
*G11B 27/00* (2006.01)
*G11B 23/04* (2006.01)
*G11B 20/10* (2006.01)

(52) U.S. Cl.
CPC ...... *G11B 27/002* (2013.01); *H04R 2227/005* (2013.01); *H04R 2420/07* (2013.01)

(56) References Cited

U.S. PATENT DOCUMENTS

| | | |
|---|---|---|
| 5,553,147 A | 9/1996 | Pineau |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,809,635 B1 | 10/2004 | Kaaresoja |
| 6,882,335 B2 | 4/2005 | Saarinen |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,311,526 B2 | 12/2007 | Rohrbach et al. |
| 7,483,538 B2 | 1/2009 | McCarty et al. |
| 7,494,098 B1 | 2/2009 | Fulda |
| 7,571,014 B1 * | 8/2009 | Lambourne ............ H04R 27/00 700/94 |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,090,317 B2 | 1/2012 | Burge et al. |
| 8,103,009 B2 | 1/2012 | McCarty et al. |
| 8,214,447 B2 | 7/2012 | Deslippe et al. |
| 8,234,395 B2 | 7/2012 | Millington et al. |
| 8,326,951 B1 | 12/2012 | Millington et al. |
| 8,483,853 B1 * | 7/2013 | Lambourne .............. H04R 3/12 381/107 |
| 8,903,526 B2 | 12/2014 | Beckhardt et al. |
| 8,910,265 B2 | 12/2014 | Lang et al. |
| 8,995,240 B1 | 3/2015 | Van Erven et al. |
| 9,042,556 B2 | 5/2015 | Kallai et al. |
| 9,137,564 B2 | 9/2015 | Reimann |
| 9,213,762 B1 | 12/2015 | Erven et al. |
| 9,223,862 B2 | 12/2015 | Beckhardt |
| 9,226,072 B2 | 12/2015 | Bender et al. |
| 9,232,277 B2 | 1/2016 | Vega et al. |
| 9,247,492 B2 | 1/2016 | Millington et al. |
| 9,285,886 B2 | 3/2016 | Reilly et al. |
| 9,286,384 B2 | 3/2016 | Kuper et al. |
| 9,300,647 B2 * | 3/2016 | Triplett ................. H04L 63/08 |
| 9,329,831 B1 | 5/2016 | Fullerton et al. |
| 9,330,096 B1 | 5/2016 | Fullerton et al. |
| 9,374,607 B2 | 6/2016 | Bates et al. |
| 9,544,701 B1 | 1/2017 | Rappoport |
| 9,554,201 B2 | 1/2017 | Williams et al. |
| 9,560,449 B2 | 1/2017 | Carlsson et al. |
| 9,686,282 B2 * | 6/2017 | Pollock ................. H04L 63/10 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0127812 A1 | 9/2002 | Matsunaga et al. |
| 2003/0157951 A1 | 8/2003 | Hasty |
| 2004/0024478 A1 | 2/2004 | Hans et al. |
| 2005/0201549 A1 | 9/2005 | Dedieu et al. |
| 2005/0286546 A1 | 12/2005 | Bassoli et al. |
| 2007/0003067 A1 | 1/2007 | Gierl et al. |
| 2007/0038999 A1 | 2/2007 | Millington et al. |
| 2007/0142944 A1 | 6/2007 | Goldberg et al. |
| 2007/0265031 A1 | 11/2007 | Koizumi et al. |
| 2008/0144864 A1 | 6/2008 | Huon |
| 2008/0146289 A1 | 6/2008 | Korneluk et al. |
| 2009/0164600 A1 * | 6/2009 | Issa ...................... H04L 67/325 709/215 |
| 2009/0217036 A1 | 8/2009 | Irwin et al. |
| 2011/0002487 A1 | 1/2011 | Panther et al. |
| 2012/0051567 A1 | 3/2012 | Castor-Perry |
| 2013/0129122 A1 | 5/2013 | Johnson et al. |
| 2013/0173034 A1 * | 7/2013 | Reimann ............ G06F 17/30761 700/94 |
| 2013/0248678 A1 | 9/2013 | Kramer |
| 2013/0316686 A1 | 11/2013 | Subbaramoo et al. |
| 2014/0006587 A1 | 1/2014 | Kusano |
| 2014/0181107 A1 | 6/2014 | Coburn et al. |
| 2014/0181199 A1 | 6/2014 | Kumar et al. |
| 2014/0181654 A1 | 6/2014 | Kumar et al. |
| 2014/0195587 A1 * | 7/2014 | Sukoff ................... H04L 67/42 709/203 |
| 2014/0230015 A1 | 8/2014 | Pollock |
| 2014/0270284 A1 | 9/2014 | Luna |
| 2014/0310316 A1 | 10/2014 | Coburn et al. |
| 2014/0323036 A1 | 10/2014 | Daley et al. |
| 2014/0324202 A1 | 10/2014 | Coburn |
| 2014/0331133 A1 | 11/2014 | Coburn, IV et al. |
| 2015/0091691 A1 | 4/2015 | Calatayud |
| 2015/0092947 A1 | 4/2015 | Gossain et al. |
| 2015/0100991 A1 | 4/2015 | Risberg et al. |
| 2015/0212788 A1 * | 7/2015 | Lang .................... H03G 3/3089 700/94 |
| 2015/0237424 A1 | 8/2015 | Wilker et al. |
| 2015/0264509 A1 * | 9/2015 | Oishi ..................... G06F 3/165 381/303 |
| 2015/0278322 A1 * | 10/2015 | Beckhardt ......... G06F 17/30053 707/636 |
| 2016/0011590 A1 * | 1/2016 | Griffiths ................ G05B 19/42 700/94 |
| 2016/0011846 A1 | 1/2016 | Sheen |
| 2016/0011848 A1 * | 1/2016 | Wilberding ............ H03G 5/005 715/716 |
| 2016/0011850 A1 | 1/2016 | Sheen et al. |
| 2016/0014512 A1 | 1/2016 | Wilberding et al. |
| 2016/0014535 A1 * | 1/2016 | Wilberding ............ H03G 5/005 381/59 |
| 2016/0014536 A1 | 1/2016 | Sheen |
| 2016/0062606 A1 | 3/2016 | Vega et al. |
| 2016/0162252 A1 | 6/2016 | Di Censo et al. |
| 2017/0019742 A1 * | 1/2017 | Rappoport ............ H04R 27/00 |
| 2017/0034648 A1 | 2/2017 | Hutchings et al. |
| 2017/0134871 A1 * | 5/2017 | Rappoport ............ H04R 27/00 |

FOREIGN PATENT DOCUMENTS

| | | |
|---|---|---|
| WO | 200153994 | 7/2001 |
| WO | 2003093950 A2 | 11/2003 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

(56) References Cited

OTHER PUBLICATIONS

Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
First Action Interview Office Action dated Oct. 23, 2015, issued in U.S. Appl. No. 14/631,723, filed Feb. 25, 2015, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Jan. 28, 2016, issued in U.S. Appl. No. 14/631,723, filed Feb. 25, 2015, 6 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
First Action Interview Office Action dated Oct. 16, 2015, issued in U.S. Appl. No. 14/631,713, filed Feb. 25, 2015, 5 pages.
Horwitz, Jeremy, "Logic3 i-Station25," retrieved from the internet: http://www.ilounge.com/index.php/reviews/entry/logic3-i-station25/, last visited Dec. 17, 2013, 5 pages.
International Bureau, International Preliminary Report on Patentability dated Jan. 30, 2014, issued in connection with International Application No. PCT/US2012/045894, filed on Jul. 9, 2012, 6 pages.
International Search Authority, International Search Report and Written Opinion dated Oct. 18, 2016, issued in connection with International Application No. PCT/US2016/042822, filed on Jul. 18, 2016, 13 pages.
International Searching Authority, International Search Report and Written Opinion dated May 25, 2016, issued in connection with International Application No. PCT/US2016/019325, filed on Feb. 24, 2016, 11 pages.
International Searching Authority, International Search Report dated Dec. 26, 2012, issued in connection with International Application No. PCT/US2012/045894, filed on Jul. 9, 2012, 3 pages.
International Searching Authority, Written Opinion dated Dec. 26, 2012, issued in connection with International Application No. PCT/US2012/045894, filed on Jul. 9, 2012, 4 pages.
"Denon 2003-2004 Product Catalog," Denon, 2003-2004, 44 pages.
Non-Final Office Action dated Feb. 1, 2016, issued in connection with U.S. Appl. No. 14/337,536, filed Jul. 22, 2014, 9 pages.
Notice of Allowance dated Aug. 1, 2016, issued in connection with U.S. Appl. No. 14/337,536, filed Jul. 22, 2014, 9 pages.
Notice of Allowance dated Nov. 16, 2016, issued in connection with U.S. Appl. No. 14/803,094, filed Jul. 19, 2015, 7 pages.
Notice of Allowance dated Jan. 28, 2016, issued in U.S. Appl. No. 14/631,713, filed Feb. 25, 2015,6 pages.
Preinterview First Office Action dated Sep. 23, 2016, issued in connection with U.S. Appl. No. 14/803,094, filed Jul. 19, 2015, 5 pages.
Roland Corporation, "Roland announces BA-55 Portable PA System," press release, Apr. 6, 2011, 2 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance dated Jun. 21, 2017, issued in connection with U.S. Appl. No. 15/357,548, filed Nov. 21, 2016, 7 pages.
Notice of Allowance dated Jul. 19, 2017, issued in connection with U.S. Appl. No. 15/338,785, filed Oct. 31, 2016, 10 pages.
Non-Final Office Action dated Mar. 10, 2017, issued in connection with U.S. Appl. No. 15/357,548, filed Nov. 21, 2016, 6 pages.
Non-Final Office Action dated Feb. 14, 2017, issued in connection with U.S. Appl. No. 15/338,785, filed Oct. 31, 2016, 7 pages.
Non-Final Office Action dated Sep. 29, 2017, issued in connection with U.S. Appl. No. 14/844,253, filed Sep. 3, 2015, 17 pages.

* cited by examiner

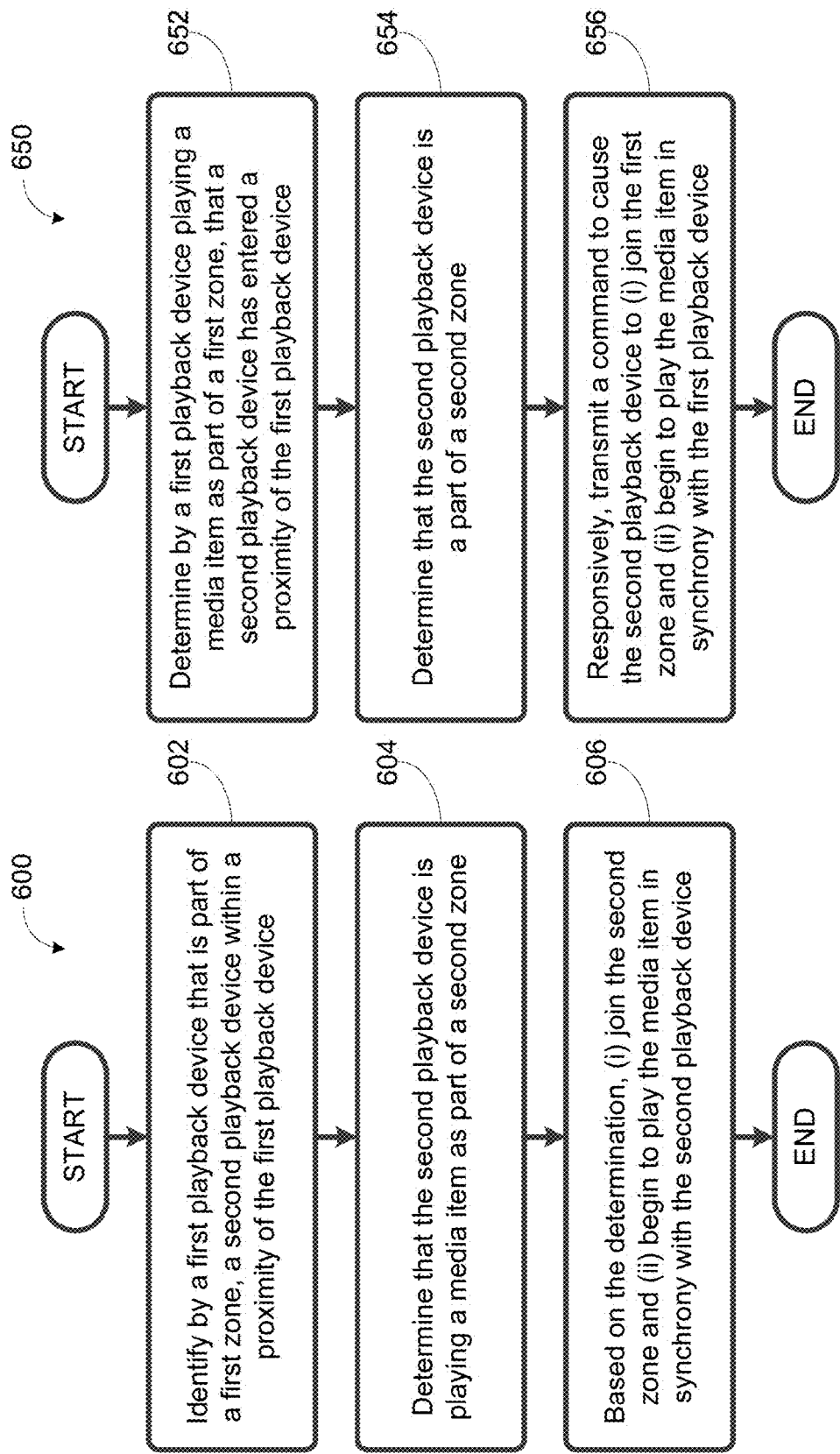

PLAYBACK EXPANSION

CROSS REFERENCE TO RELATED APPLICATIONS

This application claims priority under 35 U.S.C. § 120 to, and is a continuation of, U.S. non-provisional patent application Ser. No. 14/631,723, filed on Feb. 25, 2015, entitled "Playback Expansion," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6A shows a flow diagram of a first example method for playback expansion;

FIG. 6B shows a flow diagram of a second example method for playback expansion;

Figure 1:
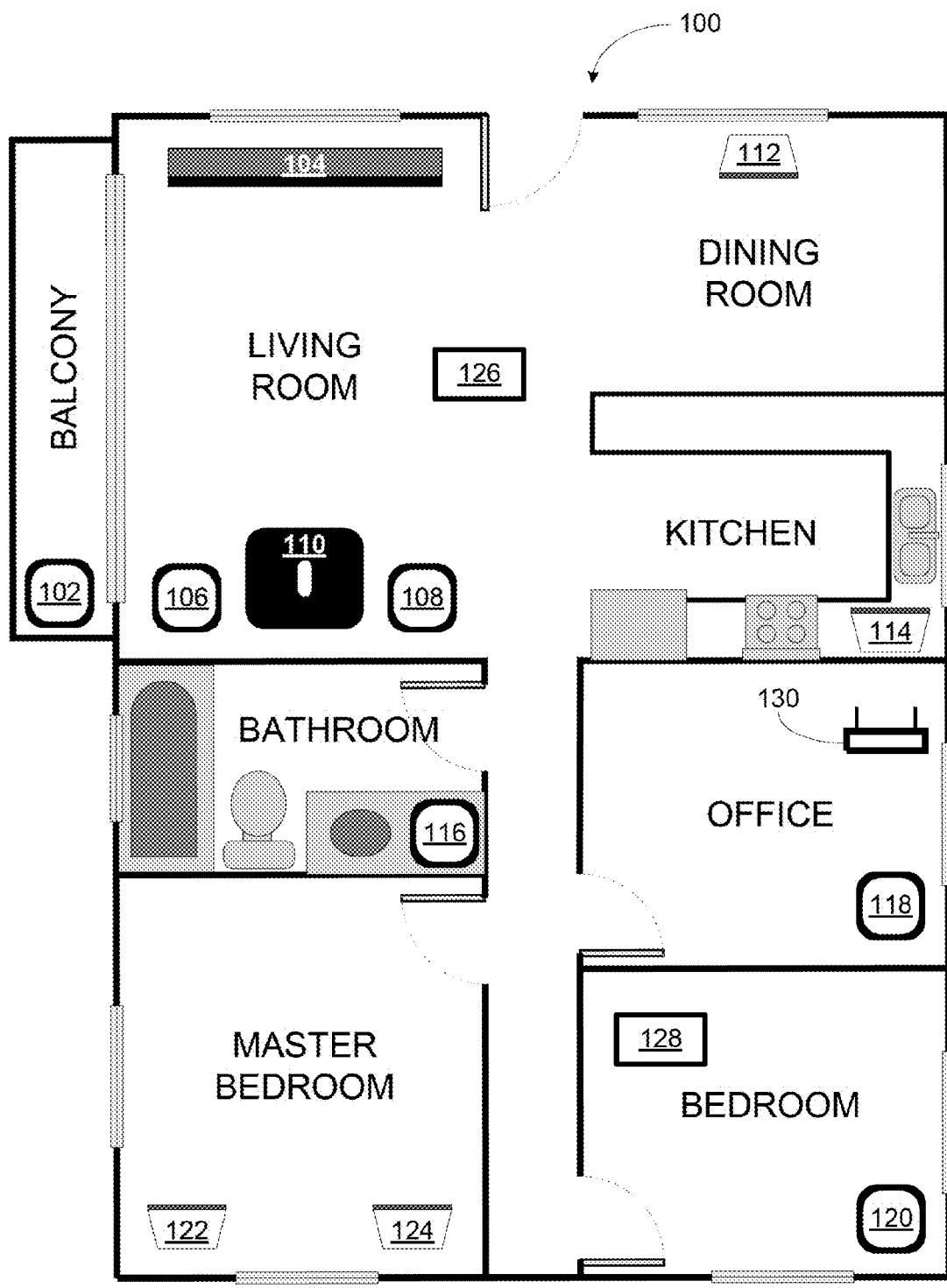
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In examples discussed herein, playback of a media item by a first playback device may be expanded to a second playback device based on changes in proximity between the first playback device and the second playback device. In some cases, the first playback device may be a part of a first zone of one or more playback devices, and the second playback device may be part of a second zone of one or more playback device. In such a case, playback of the media item by the first playback device as part of the first zone may be expanded to the second zone. In one instance, one of the first playback device and the second playback device may be powered from an internal battery. In another instance, one of the first playback device and the second playback device may be powered from an external source (i.e. power outlet).

In one example, a first playback device, while a part of a first zone, may identify a second playback device within a proximity of the first playback device. In one case, the first playback device may have been moved from an initial location to a new location such that the second playback device is now within the proximity of the first playback device. In such a case, the first playback device may identify the second playback device upon the first playback device being placed at the new location.

The first playback device may determine that the second playback device is playing a media item as part of a second zone, and based on the determination, (i) join the second zone and (ii) begin playing the media item in synchrony with the second playback device. As such, in this example, playback of the media item may be automatically expanded to the first playback device from the second playback device.

In another example, a first playback device may be playing a media item as a part of a first zone. While the first playback device is playing the media item as part of the first zone, the first playback device may determine that a second playback device has entered a proximity of the first playback device. For instance, the second playback device may have been moved from an initial location to a new location within the proximity of the first playback device.

The first playback device may then determine that the second playback device is a part of a second zone. The first playback device may then responsively transmit a command to cause the second playback device to (i) join the first zone and (ii) begin to play the media item in synchrony with the first playback device. As such, in this example, the playback of the media item may be automatically expanded from the first playback device to the second playback device.

In the two examples above, playback of the media item may be automatically expanded from a stationary playback device to a playback device that was moved within a proximity of the stationary playback device. Other such examples are also possible.

In a further example, a first playback device may be playing a media item as a part of a first zone. While the first playback device is playing the media item as part of the first zone, the first playback device may identify a second playback device within a proximity of the first playback device. In one case, the first playback device may have been moved from an initial location to a new location such that the second playback device is now within the proximity of the first playback device. In such a case, the first playback device may identify the second playback device upon the first playback device being placed in the new location.

The first playback device may then determine that the second playback device is a part of a second zone. The first playback device may then responsively transmit a command to cause the second playback device to (i) join the first zone and (ii) begin to play the media item in synchrony with the first playback device. As such, in this example, the playback of the media item may be automatically expanded from the first playback device to the second playback device.

In yet another example, the first playback device, while a part of a first zone, may determine that a second playback device has entered a proximity of the first playback device. For instance, the second playback device may have been moved from an initial location to a new location within the proximity of the first playback device.

The first playback device may determine that the second playback device is playing a media item as part of a second zone, and based on the determination, (i) join the second zone and (ii) begin playing the media item in synchrony with the second playback device. As such, in this example, playback of the media item may be automatically expanded to the first playback device from the second playback device.

In the two examples above, playback of the media item may be expanded to a stationary playback device from a portable playback device that was moved within a proximity of the stationary playback device. Other such examples are also possible.

As indicated above, the present discussions involve expanding playback of a media item from one playback device to another playback device. In one aspect, a first playback device is provided. The first playback device includes a processor and memory having stored thereon instructions executable by the processor to cause the device to perform functions. The functions include while the first playback device is a part of a first zone, identifying a second playback device within a proximity of the first playback device, determining that the second playback device is playing a media item as part of a second zone, and based on the determination, (i) joining the second zone and (ii) beginning to play the media item in synchrony with the second playback device.

In another aspect, a first playback device is provided. The first playback device includes a processor and memory having stored thereon instructions executable by the processor to cause the device to perform functions. The functions include while the first playback device is playing a media item as a part of a first zone, determining that a second playback device has entered within a proximity of the first playback device, determining that the second playback device is a part of a second zone, and responsively, transmitting a command to cause the second playback device to (i) join the first zone and (ii) begin playing the media item in synchrony with the first playback device.

In another aspect, a method is provided. The method involves while the first playback device is playing a media item as a part of a first zone, determining that a second playback device has entered within a proximity of the first playback device, determining that the second playback device is a part of a second zone, and responsively, transmitting a command to cause the second playback device to (i) join the first zone and (ii) begin playing the media item in synchrony with the first playback device.

In another aspect, a first playback device is provided. The first playback device includes a processor and memory having stored thereon instructions executable by the processor to cause the device to perform functions. The functions include while the first playback device is playing a media item as part of a first zone, identifying a second playback device within a proximity of the first playback device, determining that the second playback device is a part of a second zone, and responsively, transmitting a command to cause the second playback device to (i) join the first zone and (ii) begin to play the media item in synchrony with the first playback device.

In another aspect, a first playback device is provided. The first playback device includes a processor and memory having stored thereon instructions executable by the processor to cause the device to perform functions. The functions include while the first playback device is playing a media item as a part of a first zone, determining that a second playback device has entered within a proximity of the first playback device, determining that the second playback device is a part of a second zone, and responsively, transmitting a command to cause the second playback device to (i) join the first zone and (ii) begin playing the media item in synchrony with the first playback device.

In another aspect, a method is provided. The method involves identifying, by a first playback device playing a media item as part of a first zone, a second playback device within a proximity of the first playback device, determining that the second playback device is a part of a second zone, and responsively, transmitting a command to cause the second playback device to (i) join the first zone and (ii) begin to play the media item in synchrony with the first playback device.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
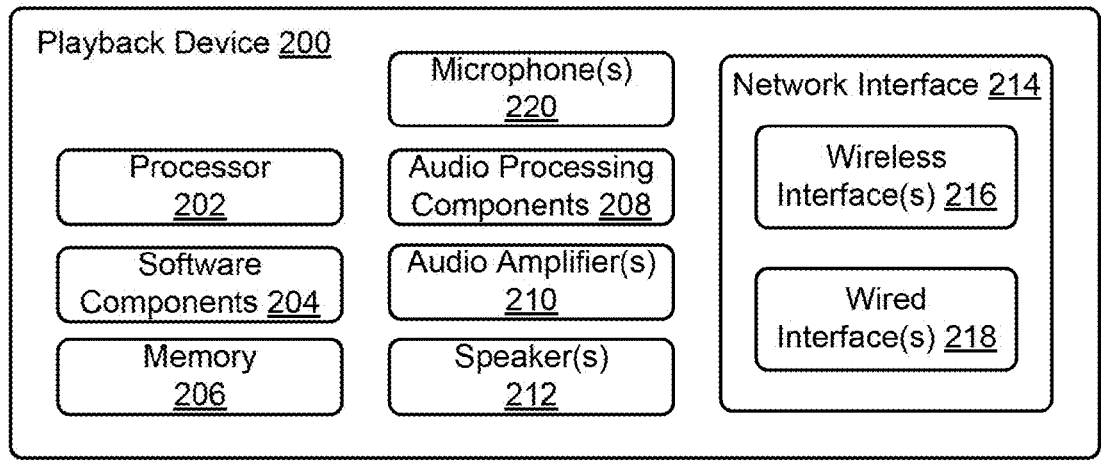
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
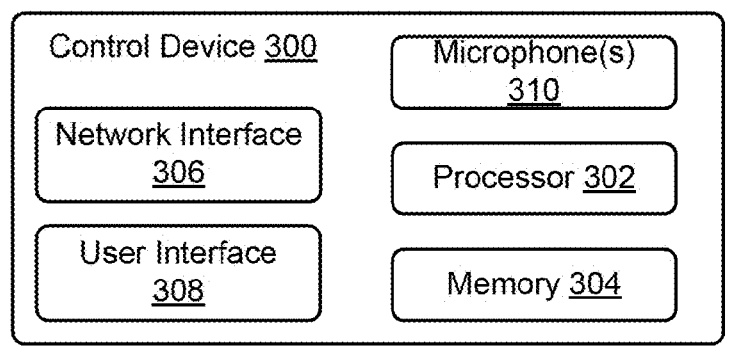
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
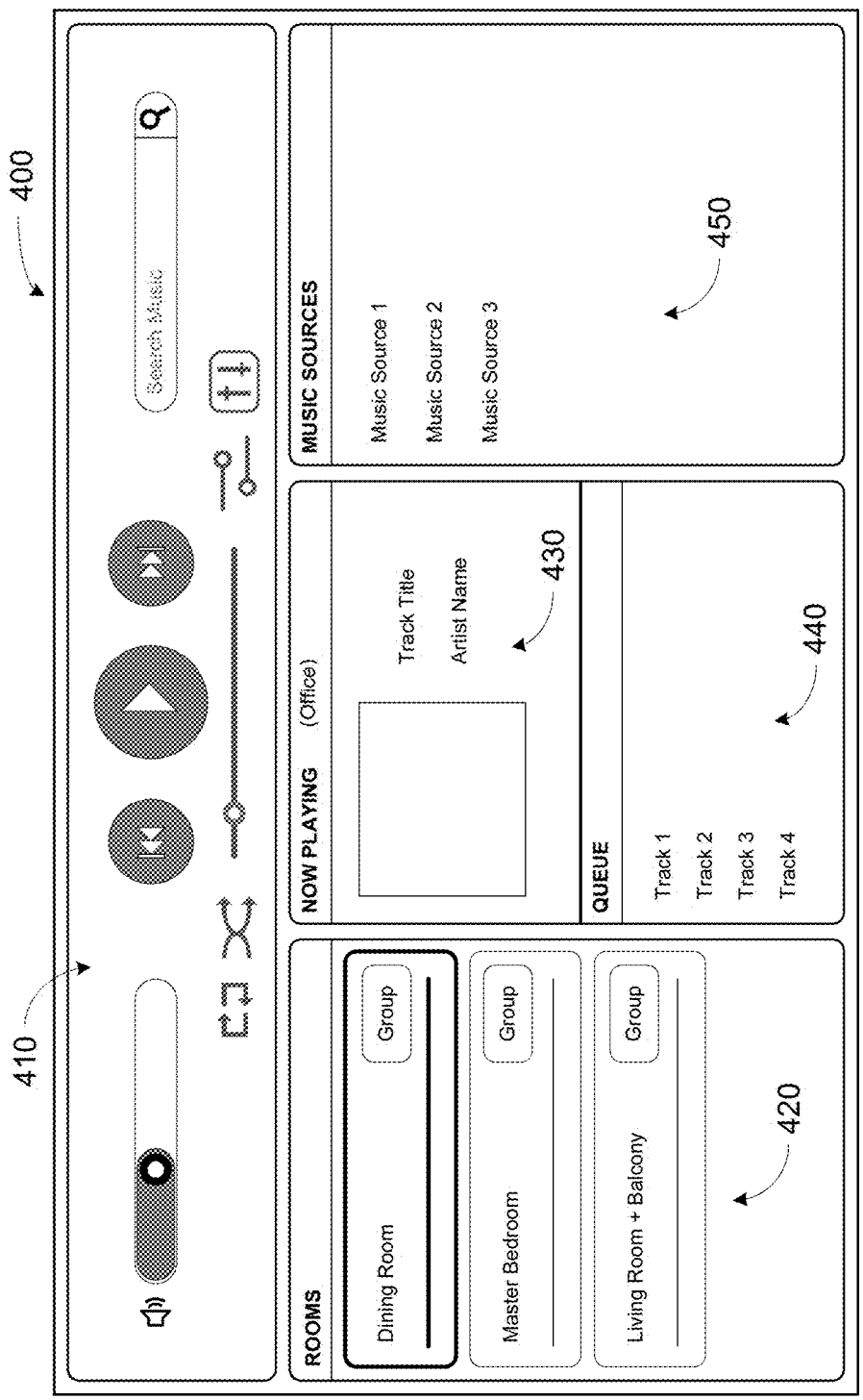
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, control devices, playback zone configurations, and media item sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Playback Device Movement Within a Playback Environment

Figure 5A:
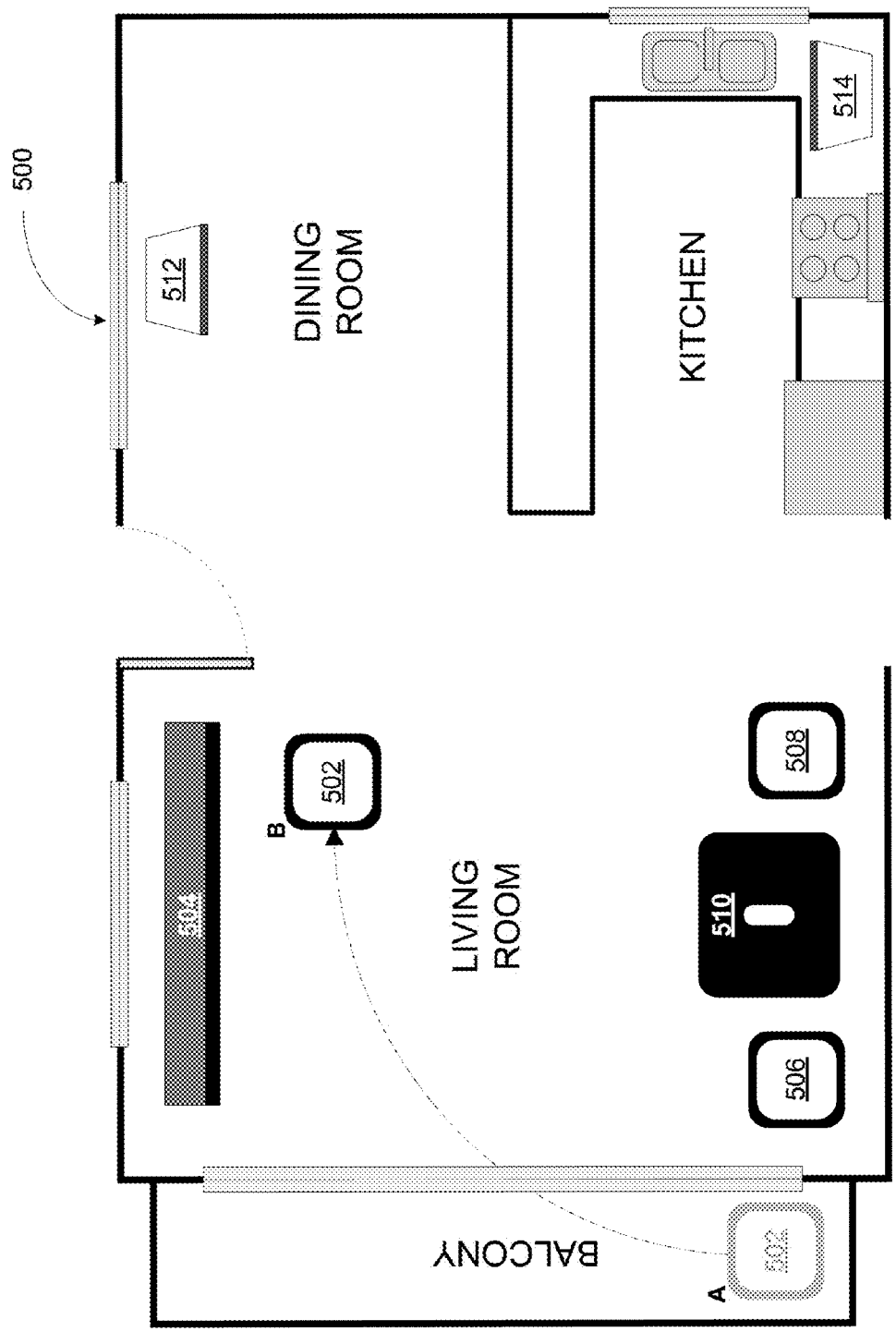
FIGS. 5A-5B show example media playback system environments.
Figure 5B:
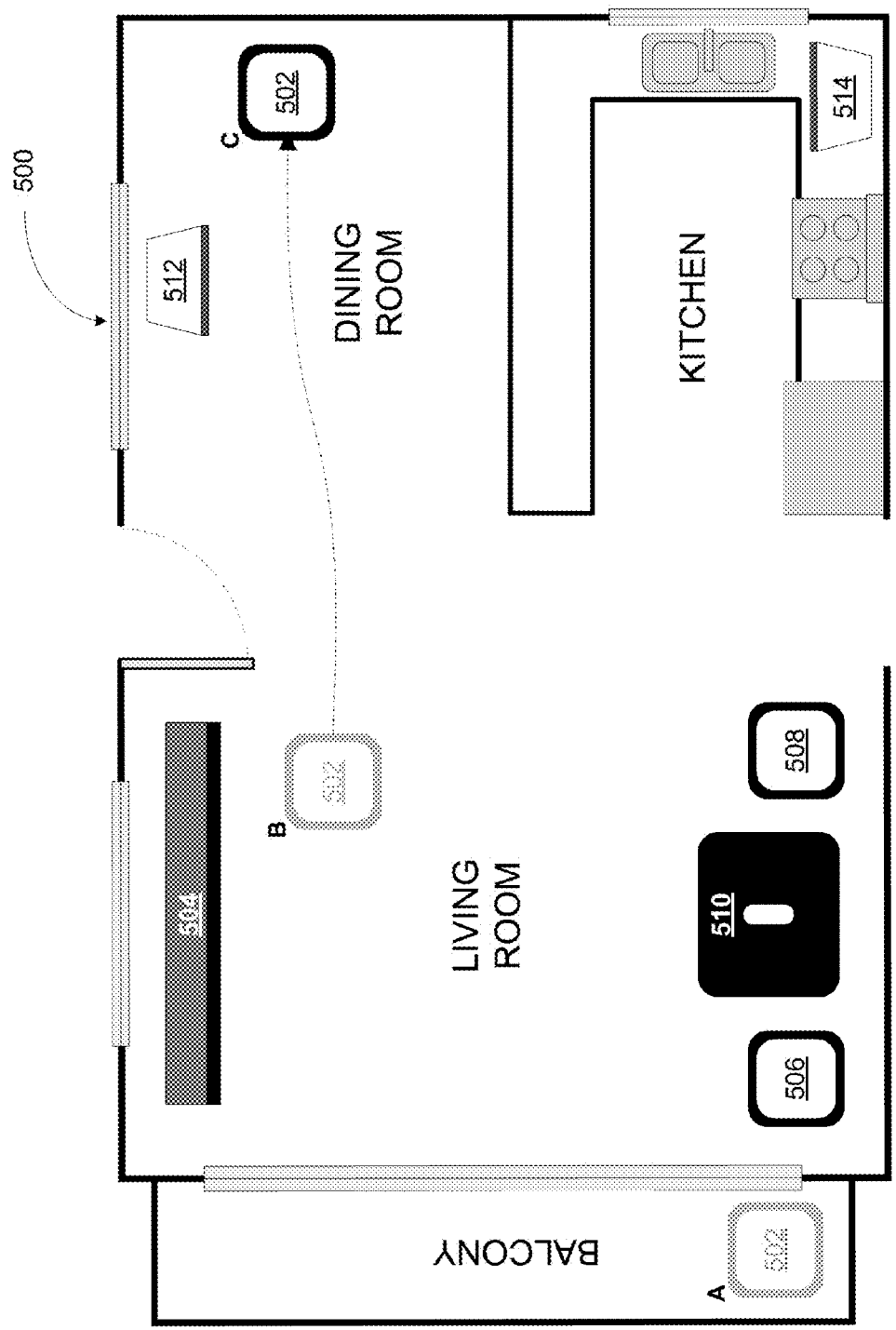

As indicated above, examples discussed herein involve expanding playback of a media item from a first playback device to a second playback device based on changes in proximity between the first playback device and the second playback device. FIGS. 5A and 5B show example media playback environments within which such examples may be implemented.

The example playback environments of FIGS. 5A and 5B may include portions of the example home environment shown in and described above in connection to FIG. 1. Accordingly, the media playback environments may be associated with a media playback system 500 that includes a portion of the devices of the media playback system 100, also shown in and described above in connection to FIG. 1. For instance, playback devices 502-514 of the media playback system 500 may correspond to playback devices 102-114 of the media playback system 100. Accordingly, playback devices 502-514 may each be similar to the playback device 200 shown in and described in connection to FIG. 2.

Playback devices 502-514 may each be configured to be powered from an external power source (i.e. power outlet) via a power cord and/or a docking station via which a docked playback device may receive power from the external power source. In addition, one or more of the playback devices 502-514 may include an internal battery from which a respective playback device may be powered. In one such case, the respective playback device may be configured to be powered from the external power source by default, if the external power source is available, and alternatively powered from the internal battery if the external power source is unavailable (i.e. playback device is unplugged or undocked). Other power sources and configurations are also possible.

As shown in FIGS. 5A and 5B, playback device 502 may be a part of a zone associated with the balcony, playback devices 504-510 may be part of a zone associated with the living room, playback device 512 may be part of a zone associated with the dining room, and playback device 514 may be part of a zone associated with the kitchen. As discussed above, each playback device may be ungrouped from one zone and added to another zone or used to form a new zone. In addition, each zone may be added to a zone group or removed from a zone group. In FIG. 5A, playback device 502 moved from a location "A" on the balcony to a location "B" in the living room. In FIG. 5B, the playback device 502 then moved from the location B to location "C" in the dining room.

FIGS. 6A, 6B, 7A, and 7B show flow diagrams of example methods 600, 650, 700, and 750, respectively, for expanding playback of a media item from a first playback device to a second playback device based on changes in proximity between the first playback device and the second playback device. Methods 600, 650, 700, and 750 present example methods that can be implemented within an operating environment involving, for example, the media playback system 100 of FIG. 1, one or more of the playback device 200 of FIG. 2, and/or the media playbacks environment 500 of FIGS. 5A and 5B. In one example, the methods 600, 650, 700, and 750 may each be performed in whole or in part by a computing device in communication with a media playback system. For instance, the methods 600, 650, 700, and 750 may be performed by one or more of the playback devices 502-514 of FIGS. 5A and 5B. In such cases, one or more of the playback devices 502-514 may have installed thereon a software application that includes instructions executable by a processor of a respective playback device to cause the respective playback device to perform the functions of methods 600, 650, 700, and/or 750.

Methods 600, 650, 700, and 750 may each include one or more operations, functions, or actions as illustrated by one or more of blocks 602-606, 652-656, 702-706, and 752-756, respectively. Although the respective blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the methods 600, 650, 700, 750, and other processes and methods disclosed herein, the flowcharts show functionality and operation of only a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block may represent circuitry that is wired to perform the specific logical functions in the process.

IV. First Example Method for Playback Expansion

As shown in FIG. 6A, the method 600 involves at block 602, identifying by a first playback device that is part of a first zone, a second playback device within a proximity of the first playback device; at block 604, determining that the second playback device is playing a media item as part of a second zone; and at block 606, based on the determination, (i) joining the second zone and (ii) beginning to play the media item in synchrony with the second playback device. The method 600 involves the first playback device expanding playback of the media item from the second playback device to the first playback device when the first playback device is placed such that the second playback device is within the proximity of the first playback device.

a. Identifying a Second Playback Device within a Proximity of the First Payback Device At block 602, the method 600 involves identifying by a first playback device that is part of a first zone, a second playback device within a proximity of the first playback device. Referring to FIG. 5A for illustrative purposes, the first playback device may be the playback device 502, the first zone may be the balcony zone, and the second playback device may be the playback device 504.

As shown, the playback device 502, while a part of the balcony zone, may move from location A on the balcony to location B in the living room. In one example, the playback device 502 may be powered from an external power source while at location A (i.e. via a dock and/or a power plug, among other possibilities), and may be powered from an internal battery when the playback device 502 is removed from location A (i.e. undocked and/or unplugged from the external power source). As such, the playback device 502 may be powered from the internal battery when the playback device 502 is at location B.

At the location B, the playback device 502 may identify that the playback device 504 is now within a proximity of playback device 504. The playback device 504 may be powered from an external power source. In one example, the playback device 502 may identify that the playback device 504 is within the proximity of the playback device 502 based on one or more proximity sensors on the playback device 502. The one or more proximity sensors may include one or more of a capacitive sensor, an inductive sensor, a laser sensor, a magnetic sensor, an infrared sensor, a photo-sensor, an acoustic sensor, and a wireless signal sensor, among other possibilities.

In one instance, a wireless signal sensor of the playback device 502 may detect a wireless signal emitted from a playback device with a signal strength above a threshold value, indicating that the playback device is within the proximity of the playback device 502. Based on the detection, the playback device 502 may parse the detected wireless signal to identify the playback device 504 as the source of the detected wireless signal and accordingly, as the playback device within the proximity of the playback device 502.

In another instance, a photo-sensor on the playback device 502 may detect that a playback device is within a proximity (i.e. threshold photo-sensing range) of the playback device 502. The playback device 502, in response to the detection, may transmit to the detected playback device, a request for information identifying the detected playback device, and subsequently identify the playback device 504 as the detected playback device based on a received response to the request. Other examples for identifying the playback device 504 as the playback device within the proximity of the first playback device are also possible.

As mentioned above, the playback device 502 moved from location A to location B. In one example, block 602 may be performed once the playback device 502 has been placed at location B. In one case, the playback device 502 may include one or more movement sensors (i.e. accelerometers, among other possibilities). As such, the movement sensors of the playback device 502 may detect a placement of the playback device 502 by detecting cessation of movement following movement of the playback device 502. The playback device 502 may then perform block 602 in response to detecting the placement of the playback device 502. Other examples are also possible.

b. Determining That the Second Playback Device is Playing a Media Item as Part of a Second Zone At block 604, the method 600 involves determining that the second playback device is playing a media item as part of a second zone. Continuing with the example above, upon identifying the playback device 504 within the proximity of the playback device 502, the playback device 502 may determine that that playback device 504 is playing a media item as part of the living room zone and is not a part of the balcony zone.

In one example, the playback device 502 may determine that the playback device 504 is playing the media item as part of the living room zone by transmitting to the playback device 504, a request for information associated with the playback device 504, and subsequently receive information from the playback device 504 indicating that the playback device 504 is playing the media item and is a part of the living room zone.

In another example, the playback device 502 may determine that the playback device 504 is playing the media item as part of the living room zone by transmitting to one or more playback devices in the media playback system 500 (including or excluding the playback device 504), a request for information associated with the playback device 504, and subsequently receive information from the one or more playback devices in the media playback system 500, information indicating that the playback device 504 is playing the media item as part of the living room zone.

In yet another example, the playback device 502 may determine that the playback device 504 is playing the media item as part of the living room zone by retrieving a locally stored state variable associated with the playback device 504. For instance, the playback device 502 (and one or more other playback devices in the media playback system 500) may maintain state variables associated with itself and other playback devices in the media playback system 500. A state variable may be updated for a corresponding playback device periodically and/or when a configuration and/or status of the corresponding playback device changes. For instance, a state variable corresponding to the playback device 504 may be updated when the playback device 504 began playing the media item as part of the living room zone. As such, the playback device 502 may retrieve the locally stored state variable that is associated with the playback device 504 to determine that the playback device 504 is playing the media item as part of the living room. Other examples are also possible.

c. Based on the Determination, (i) Joining the Second Zone and (ii) Beginning to Play the Media Item in Synchrony with the Second Playback Device At block 606, the method 600 involves based on the determination, (i) joining the second zone and (ii) beginning to play the media item in synchrony with the second playback device. Continuing with the example above, the playback device 502 may join the living room zone and begin playing the media item in synchrony with the playback device 504. In other words, the playback device 502 may join the living room zone, and accordingly begin playing the media item as part of the living room zone, which involves playing the media item in synchrony with the playback device 504. As indicated above, U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

In one example, the playback device 502 may begin playing the media item in synchrony with the playback device 504 at a volume level that the playback device 502 was previously playing media content. In another example, the playback device 502 may begin playing the media item in synchrony with the playback device 504 at a particular volume level determined based on a playback volume level of the playback device 504. In one case, if the playback device 502 is a same type of playback device as the playback device 504 (i.e. same model), the particular volume level may be the same as the volume level of the playback device 504. In another case, if the playback device 502 has a lower audio output power (i.e. lower wattage amplifier, among other possibilities), the particular volume level may be higher than the volume level of the playback device 504 in order to properly match the playback volume output of the playback device 504. Analogously, if the playback device 502 has a higher audio output power (i.e. higher wattage amplifier, among other possibilities), the particular volume level may be lower than the volume level of the playback device 504. Other cases are also possible.

In a further example, the playback device 502, when beginning to play the media item in synchrony with the playback device 504, may gradually increase a playback volume of the media item from a first playback volume to a second playback volume over a duration of time. In this example, the first playback volume may be a volume level of zero, and the second playback volume may be the particular playback volume determined based on the playback volume of the playback device 504, as discussed above. Examples of the duration of time may be anywhere between 3 to 15 seconds. In one case, the volume increase from the first playback volume to the second playback volume may be performed at a predetermined rate, such as 2 volume units per second. In this case, the duration of time may vary based on a difference between the first playback volume and the second playback volume. Other examples are also possible.

Once the playback device 502 has joined the living room zone and begun playing the media item in synchrony with the playback device 504, the playback device 502 may provide an indication to any users or listeners in the playback environment that the playback device 502 is joining or has joined the living room zone. The indication may include one or more of a playback of an audio signal, a flashing of a light source on the playback device 502, and a vibration of the playback device 502, among other possibilities.

Referring to FIG. 5B, the playback device 502, after being placed at location B in the living room zone, may be subsequently moved to location C in the dining room zone. In one example, if the playback device 502 has already joined the living room zone and/or is already playing the media item in synchrony with the playback device 504 when the playback device 502 is subsequently moved to location C, the playback device 502 may again perform the method 600 of FIG. 6A. In this case, however, playback device 512 may be the second playback device of method 600, and the dining room zone may be the second zone of method 600.

In another example, the playback device 502 may be subsequently moved from location B before the playback device 502 has completed a process of joining the living room zone and/or beginning to play the media item in synchrony with the playback device 504. This may be the case when a user who is moving the playback device 502 from the balcony to the dining room, on the way to the dining room, temporarily places the playback device 502 in the living room near the playback device 504 before eventually moving the playback device 502 to the dining room. The user may perhaps be dropping off an item from the balcony in the living room and/or picking up an item in the living room to also bring to the dining room when the playback device 502 is temporarily placed at location B. Whichever the case, the temporary placement of the playback device 502 in the living room near the playback device 504 may accordingly cause the playback device 502 to begin to perform method 600.

In this example, the playback device 502, while in the process of joining the living room zone and/or beginning to play the media item in synchrony with the playback device 504, may detect movement of the playback device 502 (i.e. via the one or more movement sensors), and responsively abort joining the second zone and cease beginning to play the media item in synchrony with the playback device 504. In one case, the process of joining the living room zone and beginning to play the media item in synchrony with the playback device 504 may include the increasing of the playback volume of the media item by the playback device 502 to the particular playback volume determined based on the playback volume of the playback device 504, as discussed above. Other examples are also possible.

V. Second Example Method for Playback Expansion

As shown in FIG. 6B, the method 650 involves at block 652, determining by a first playback device playing a media item as part of a first zone, that a second playback device has entered a proximity of the first playback device; at block 654, determining that the second playback device is a part of a second zone; and at block 656, responsively transmitting a command to cause the second playback device to (i) join the first zone and (ii) begin to play the media item in synchrony with the first playback device. The method 650 involves the first playback device expanding playback of the media item from the first playback device to the second playback device when the second playback device is placed within the proximity of the first playback device.

a. Determining that a Second Playback Device has Entered Within a Proximity of the First Playback Device At block 652, the method 650 involves determining by a first playback device playing a media item as part of a first zone, that a second playback device has entered a proximity of the first playback device. Referring to FIG. 5A for illustrative purposes, the first playback device may be the playback device 504, the first zone may be a living room zone, and the second playback device may be the playback device 502.

As shown, the playback device 504 may be playing a media item as part of the living room zone, when the playback device 502 moved to location B, within a proximity of the playback device 504. In one example, the playback device 504 may be powered from an external power source while the playback device 502 may be powered from an internal battery.

With playback device 502 now at location B, the playback device 504 may determine that the playback device 502 has entered within the proximity of playback device 504. In one example, the playback device 504 may determine that the playback device 502 has entered within the proximity of the playback device 504 based on one or more proximity sensors on the playback device 504. The one or more proximity sensors may include one or more of a capacitive sensor, an inductive sensor, a laser sensor, a magnetic sensor, an infrared sensor, a photo-sensor, an acoustic sensor, and a wireless signal sensor, among other possibilities.

In one instance, a wireless signal sensor of the playback device 504 may detect a wireless signal emitted from a playback device with a signal strength that is now above a threshold value, indicating that the playback device has now entered within the proximity of the playback device 504. Based on the detection, the playback device 504 may parse the detected wireless signal to identify the playback device 502 as the source of the detected wireless signal and accordingly, as the playback device within the proximity of the playback device 504.

In another instance, a photo-sensor on the playback device 504 may detect that a playback device has entered within a proximity (i.e. photo-sensing range) of the playback device 504. The playback device 504, in response to the detection, may transmit to the detected playback device, a request for information identifying the detected playback device, and subsequently identify the playback device 502 as the detected playback device based on a received response to the request. Other examples for identifying the playback device 502 as the playback device that has entered within the proximity of the first playback device are also possible.

b. Determining That the Second Playback Device is a Part of a Second Zone

At block 654, the method 650 involves determining that the second playback device is a part of a second zone. Continuing with the example above, upon determining that the playback device 502 has entered within the proximity of the playback device 504, the playback device 504 may determine that that playback device 502 is a part of the balcony zone and not a part of the living room zone.

In one example, the playback device 504 may determine that the playback device 502 is a part of the balcony zone by transmitting to the playback device 502 a request for information associated with the playback device 502, and subsequently receive information from the playback device 502 indicating that the playback device 502 is a part of the balcony zone.

In another example, the playback device 504 may determine that the playback device 502 is a part of the balcony zone by transmitting to one or more playback devices in the media playback system 500 (including or excluding the playback device 502), a request for information associated with the playback device 502, and subsequently receive information from the one or more playback devices in the media playback system 500, information indicating that the playback device 502 is a part of the balcony zone.

In yet another example, the playback device 504 may determine that the playback device 502 is a part of the balcony zone by retrieving a locally stored state variable associated with the playback device 502. For instance, the playback device 504 (and one or more other playback devices in the media playback system 500) may maintain state variables associated with itself and other playback devices in the media playback system 500. A state variable may have been updated for a corresponding playback device periodically and/or when a configuration and/or status of the corresponding playback device changes. For instance, a state variable corresponding to the playback device 502 may be updated when the playback device 502 became a part of the balcony zone. As such, the playback device 504 may retrieve the locally stored state variable that is associated with the playback device 502 to determine that the playback device 502 is a part of the balcony. Other examples are also possible.

As shown in FIG. 5A, the playback device 502 moved from location A to location B, within the proximity of the playback device 504. In one example, block 654 may be performed by the playback device 504 once the playback device 504 determines that the playback device 502 has entered within the proximity of the playback device 504. In another example, the playback device 504 may determine that the playback device 502 has been placed, and is not actively in transition, before performing block 654.

In one case, the playback device 504 may determine using the one or more proximity sensors on the playback device 504, whether the playback device 502 is still in transition. For instance, if the one or more proximity sensors detect a substantially consistent presence of the playback device 502 within the proximity of the playback device 504, the playback device 504 may determine that the playback device 502 has been placed and proceed to perform block 654. In another instance, if the one or more proximity sensors detect a substantially varying presence of the playback device 502 within the proximity of the playback device 504, the playback device 504 may determine that the playback device 502 has not been placed and may not proceed to perform block 654.

In another case, the playback device 504, prior to performing block 654, may transmit to the playback device 502 a request for information indicating whether the playback device 502 has been placed. The playback device 504 may then determine whether to proceed to perform block 654 based on a response from the playback device 502 indicating whether the playback device 502 has been placed. As indicated previously, the playback device 502 may include one or more movement sensors (i.e. accelerometers, among other possibilities) to determine whether the playback device 502 has been placed. Other examples are also possible.

c. Responsively, Transmitting a Command to Cause the Second Playback Device to (i) Join the First Zone and (ii) Begin to Play the Media Item in Synchrony with the First Playback Device At block 656, the method 650 involves responsively, transmitting a command to cause the second playback device to (i) join the first zone and (ii) begin to play the media item in synchrony with the first playback device. Continuing with the example above, the playback device 504 may transmit to the playback device 502, a command to cause the playback device 502 to join the living room zone and begin to play the media item in synchrony with the playback device 504. In one case, causing the playback device 502 to join the living room zone may accordingly cause the playback device 502 to begin playing the media item as part of the living room zone, which involves playing the media item in synchrony with the playback device 504. As indicated above, U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

In one example, if the playback device 504 proceeded to block 654 from block 652 without determining whether the playback device 502 has been placed, the playback device 504 may determine whether the playback device 502 has been placed prior to performing block 656.

In one example, a playback volume of the playback device 502 when the playback device 502 begins to play the media content in synchrony with the playback device 504 may be determined by the playback device 502. In another example, the playback volume of the playback device 502 when the playback device begins to play the media content in synchrony with the playback device 504 may be according to the command transmitted from the playback device 504 to the playback device 502 to cause the playback device 502 to join the living room zone and play the media item in synchrony with the playback device 504.

In one case, the command may cause the playback device 502 to begin playing the media item in synchrony with the playback device 504 at a volume level that the playback device 502 was previously playing media content. In another case, the command may cause the playback device 502 to begin playing the media item in synchrony with the playback device 504 at a particular volume level determined based on a playback volume level of the playback device 504. In one instance, if the playback device 502 is a same type of playback device as the playback device 504 (i.e. same model), the particular volume level may be the same as the volume level of the playback device 504. In another instance, if the playback device 502 has a lower audio output power (i.e. lower wattage amplifier, among other possibilities), the particular volume level may be higher than the volume level of the playback device 504 to properly match the playback volume output of the playback device 504. Analogously, if the playback device 502 has a higher audio output power (i.e. higher wattage amplifier, among other possibilities), the particular volume level may be lower than the volume level of the playback device 504. Other examples are also possible.

In a further case, the command may cause the playback device 502, when beginning to play the media item in synchrony with the playback device 504, to gradually increase a playback volume of the media item from a first playback volume to a second playback volume over a duration of time. In this example, the first playback volume may be a volume level of zero, and the second playback volume may be the particular playback volume determined based on the playback volume of the playback device 504, as discussed above. Examples of the duration of time may be anywhere between 3 to 15 seconds. In one instance, the volume increase from the first playback volume to the second playback volume may be performed at a predetermined rate, such as 2 volume units per second. In this instance, the duration of time may vary based on the difference between the first playback volume and the second playback volume. Other examples are also possible.

In one example, the command from the playback device 504 to cause the playback device 502 to join the living room zone and begin to play the media item in synchrony with the playback device 504 may further include a command to cause the playback device 502 to provide an indication to any users or listeners in the playback environment that the playback device 502 is joining the living room zone. The indication may include one or more of a playback of an audio signal, a flashing of a light source on the playback device 502, and a vibration of the playback device 502, among other possibilities.

Referring to FIG. 5B, the playback device 502, after entering within the proximity of the playback device 504 and/or being placed at location B, in the living room zone, may be subsequently moved to location C in the dining room zone. In one example, the playback device 502 may be subsequently moved from the location B before the playback device 502 has completed a process of joining the living room zone and/or beginning to play the media item in synchrony with the playback device 504. This may be the case when a user, who is moving the playback device 502 from the balcony to the dining room, on the way to the dining room, temporarily places the playback device 502 in the living room near the playback device 504 before eventually moving the playback device 502 to the dining room. The user may perhaps be dropping off an item from the balcony in the living room and/or picking up an item in the living room to also bring to the dining room when the playback device 502 is temporarily placed at location B. Whichever the case, the temporary placement of the playback device 502 in the living room near the playback device 504 may accordingly cause the playback device 504 to begin performing the method 650.

In one example, if the playback device 504 determines within a predetermined duration of time after transmitting the command to the playback device 502, that the playback device 502 is moving, the playback device 504 may transmit to the playback device 502, a command to cause the playback device 502 to abort joining the living room zone and cease beginning to play the media item.

The predetermined duration of time may be determined based on an expected duration of time between when the playback device 504 transmits the command to cause the playback device 502 to join the living room zone and begin playing the media item in synchrony with the playback device 504 and when the playback device 502 completes joining the living room zone and beginning playback of the media item in synchrony with the playback device 504. In one case, the predetermined duration of time may include the duration of time for the playback volume of the media item by the playback device 502 to increase to the particular playback volume determined based on the playback volume of the playback device 504, as discussed above. Other examples are also possible.

In another example, the command transmitted from the playback device 504 to the playback device 502 to cause the playback device 502 to join the living room zone and begin playing the media item in synchrony with the playback device 504 may further include a command to cause the playback device 502 to transmit a confirmation message upon completion of joining the living room zone and beginning to play the media item in synchrony with the playback device 504. In this example, if the playback device 504 determines, prior to receiving the confirmation message from the playback device 502, that the playback device 502 is moving, the playback device 504 may transmit to the playback device 502, a command to cause the playback device 502 to abort joining the living room zone and cease beginning to play the media.

In one case, the playback device 504 may determine that the playback device 502 is moving if the one or more proximity sensors on the playback device 504 detect a substantially varying presence of the playback device 502 within the proximity of the playback device 504. In another case, the playback device 504 may determine that the playback device 502 is moving if the playback device 504 receives from the playback device 502, information indicating that the playback device 502 is moving. Other examples are also possible.

VI. Third Example Method for Playback Expansion

Figures 7A, 7B:
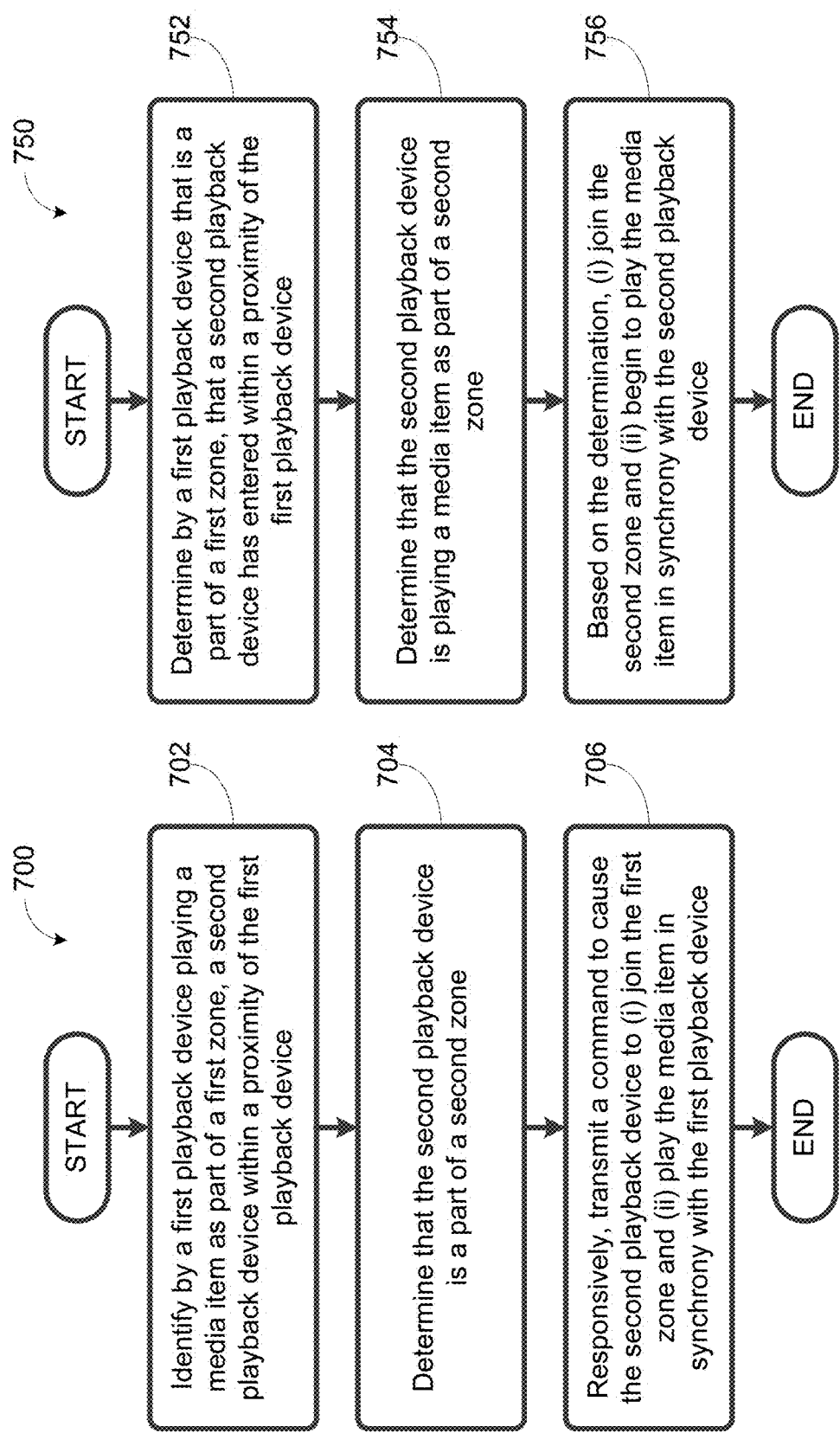
FIG. 7A shows a flow diagram of a third example method for playback expansion.
FIG. 7B shows a flow diagram of a fourth example method for playback expansion.

As shown in FIG. 7A, the method 700 involves at block 702, identifying by a first playback device playing a media item as part of a first zone, a second playback device within a proximity of the first playback device; at block 704, determining that the second playback device is a part of a second zone; and at block 706, responsively transmitting a command to cause the second playback device to (i) join the first zone and (ii) play the media item in synchrony with the first playback device. The method 700 involves the first playback device expanding playback of the media item from the first playback device to the second playback device when the first playback device is placed such that the second playback device is within the proximity of the first playback device.

a. Identifying a Second Playback Device Within a Proximity of the First Playback Device At block 702, the method 700 involves identifying by a first playback device playing a media item as part of a first zone, a second playback device within a proximity of the first playback device. Referring to FIG. 5A for illustrative purposes, the first playback device may be the playback device 502, the first zone may be a balcony zone, and the second playback device may be the playback device 504.

As shown, the playback device 502, while playing the media item as a part of the balcony zone, may move from location A on the balcony to location B in the living room. In one example, the playback device 502 may be powered from an external power source while at location A (i.e. via a dock and/or a power plug, among other possibilities), and may be powered from an internal battery when the playback device 502 is removed from location A (i.e. undocked and/or unplugged from the external power source). As such, the playback device 502 may be powered from the internal battery when the playback device 502 is at the location 502.

At the location B, the playback device 502 may identify that the playback device 504 is now within a proximity of playback device 502. The playback device 504 may be powered from an external power source. In one example, the playback device 502 may identify that the playback device 504 is within the proximity of the playback device 502 based on one or more proximity sensors on the playback device 502. The one or more proximity sensors may include one or more of a capacitive sensor, an inductive sensor, a laser sensor, a magnetic sensor, an infrared sensor, a photo-sensor, an acoustic sensor, and a wireless signal sensor, among other possibilities.

In one instance, a wireless signal sensor of the playback device 502 may detect a wireless signal emitted from a playback device with a signal strength above a threshold value, indicating that the playback device is within the proximity of the playback device 502. Based on the detection, the playback device 502 may parse the detected wireless signal to identify the playback device 504 as the source of the detected wireless signal and accordingly, as the playback device within the proximity of the playback device 502.

In another instance, a photo-sensor on the playback device 502 may detect that a playback device is within a proximity (i.e. photo-sensing range) of the playback device 502. The playback device 502, in response to the detection, may transmit to the detected playback device, a request for information identifying the detected playback device, and subsequently identify the playback device 504 as the detected playback device based on a received response to the request. Other examples for identifying the playback device 504 as the playback device within the proximity of the first playback device are also possible.

As mentioned above, the playback device 502 moved from location A to location B. In one example, block 702 may be performed once the playback device 502 has been placed at location B. In one case, the playback device 502 may include one or more movement sensors (i.e. accelerometers, among other possibilities). As such, the movement sensors of the playback device 502 may detect a placement of the playback device 502 by detecting cessation of movement following movement of the playback device 502. The playback device 502 may then perform block 702 in response to detecting the placement of the playback device 502. Other examples are also possible.

b. Determining That the Second Playback Device is a Part of a Second Zone

At block 704, the method 700 involves determining that the second playback device is a part of a second zone. Continuing with the example above, upon identifying the playback device 504 within the proximity of the playback device 504, the playback device 502 may determine that that playback device 504 is a part of the living room zone and not a part of the balcony zone.

In one example, the playback device 502 may determine that the playback device 504 is a part of the living room zone by transmitting to the playback device 504 a request for information associated with the playback device 504, and subsequently receive information from the playback device 504 indicating that the playback device 504 is a part of the living room zone.

In another example, the playback device 502 may determine that the playback device 504 is a part of the living room zone by transmitting to one or more playback devices in the media playback system 500 (including or excluding the playback device 502), a request for information associated with the playback device 504, and subsequently receive information from the one or more playback devices in the media playback system 500, information indicating that the playback device 504 is a part of the living room zone.

In yet another example, the playback device 502 may determine that the playback device 504 is a part of the living room zone by retrieving a locally stored state variable associated with the playback device 504. For instance, the playback device 502 (and one or more other playback devices in the media playback system 500) may maintain state variables associated with itself and other playback devices in the media playback system 500. A state variable may be updated for a corresponding playback device periodically and/or when a configuration and/or status of the corresponding playback device changes. For instance, a state variable corresponding to the playback device 504 may have been updated when the playback device 504 became a part of the living room zone. As such, the playback device 502 may retrieve the locally stored state variable that is associated with the playback device 504 to determine that the playback device 504 is a part of the living room. Other examples are also possible.

c. Responsively, Transmitting a Command to Cause the Second Playback Device to (i) Join the First Zone and (ii) Play the Media Item in Synchrony with the First Playback Device At block 706, the method 700 involves responsively, transmitting a command to cause the second playback device to (i) join the first zone and (ii) play the media item in synchrony with the first playback device. Continuing with the example above, the playback device 502 may transmit to the playback device 504, a command to cause the playback device 502 to join the balcony zone and begin to play the media item in synchrony with the playback device 502. In one case, causing the playback device 504 to join the balcony zone may accordingly cause the playback device 504 to begin playing the media item as part of the balcony zone, which involves playing the media item in synchrony with the playback device 502. As indicated above, U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

In one example, a playback volume of the playback device 504 when the playback device 504 begins to play the media content in synchrony with the playback device 502 may be determined by the playback device 504. In another example, the playback volume of the playback device 504 when the playback device begins to play the media content in synchrony with the playback device 502 may be according to the command transmitted from the playback device 502 to the playback device 504 to cause the playback device 504 to join the balcony zone and play the media item in synchrony with the playback device 502.

In one case, the command may cause the playback device 504 to begin playing the media item in synchrony with the playback device 502 at a volume level that the playback device 504 was previously playing media content. In another case, the command may cause the playback device 504 to begin playing the media item in synchrony with the playback device 502 at a particular volume level determined based on a playback volume level of the playback device 502. In one instance, if the playback device 504 is a same type of playback device as the playback device 502 (i.e. same model), the particular volume level may be the same as the volume level of the playback device 502. In another instance, if the playback device 504 has a lower audio output power (i.e. lower wattage amplifier, among other possibilities), the particular volume level may be higher than the volume level of the playback device 502 to properly match the volume output of the playback device 502. analogously, if the playback device 504 has a higher audio output power (i.e. higher wattage amplifier, among other possibilities), the particular volume level may be lower than the volume level of the playback device 502. Other examples are also possible.

In a further case, the command may cause the playback device 504, when beginning to play the media item in synchrony with the playback device 502, to gradually increase a playback volume of the media item from a first playback volume to a second playback volume over a duration of time. In this example, the first playback volume may be a volume level of zero, and the second playback volume may be the particular playback volume determined based on the playback volume of the playback device 502, as discussed above. Examples of the duration of time may be anywhere between 3 to 15 seconds. In one instance, the volume increase from the first playback volume to the second playback volume may be performed at a predetermined rate, such as 2 volume units per second. In this instance, the duration of time may vary based on the difference between the first playback volume and the second playback volume. Other examples are also possible.

In one example, the command from the playback device 502 to cause the playback device 504 to join the balcony zone and begin to play the media item in synchrony with the playback device 502 may further include a command to cause the playback device 504 to provide an indication to any users or listeners in the playback environment that the playback device 504 is joining the balcony zone. The indication may include one or more of a playback of an audio signal, a flashing of a light source on the playback device 504, and a vibration of the playback device 504, among other possibilities.

Referring to FIG. 5B, the playback device 502, after being placed at location B in the living room zone such that the playback device 504 is within the proximity of the playback device 502, may be subsequently moved to location C in the dining room zone. In one example, the playback device 502 may be subsequently moved from the location B before the playback device 504 has completed a process of joining the balcony zone and/or beginning to play the media item in synchrony with the playback device 502. This may be the case when a user who is moving the playback device 502 from the balcony to the dining room, on the way to the dining room, temporarily places the playback device 502 in the living room near the playback device 504 before eventually moving the playback device 502 to the dining room. The user may perhaps be dropping off an item from the balcony in the living room and/or picking up an item in the living room to also bring to the dining room when the playback device 502 is temporarily placed at location B. Whichever the case, the temporary placement of the playback device 502 in the living room near the playback device 504 may accordingly cause the playback device 502 to begin performing the method 700.

In one example, if the playback device 502 detects movement of the playback device 502 (i.e. via the one or more movement sensors) within a predetermined duration of time after transmitting the command cause the playback device 504 to join the balcony zone and begin playing the media item in synchrony with the playback device 502, the playback device 502 may transmit to the playback device 504, a command to cause the playback device 504 to abort joining the balcony zone and cease beginning to play the media item.

The predetermined duration of time may be determined based on an expected duration of time between when the playback device 502 transmits the command to cause the playback device 504 to join the balcony zone and begin playing the media item in synchrony with the playback device 502 and when the playback device 504 completes joining the balcony zone and beginning playback the media item in synchrony with the playback device 502. In one case, the predetermined duration of time may include the duration of time for the playback volume of the media item by the playback device 504 to increase to the particular playback volume determined based on the playback volume of the playback device 502, as discussed above. Other examples are also possible.

In another example, the command transmitted from the playback device 502 to the playback device 504 to cause the playback device 504 to join the balcony zone and begin playing the media item in synchrony with the playback device 502 may further include a command to cause the playback device 504 to transmit a confirmation message upon completion of joining the balcony zone and beginning to play the media item in synchrony with the playback device 502. In this example, if the playback device 502 detects movement of the playback device 502 prior to receiving the confirmation message from the playback device 504, the playback device 502 may transmit to the playback device 504, a command to cause the playback device 504 to abort joining the living room zone and cease beginning to play the media. Other examples are also possible.

VII. Fourth Example Method for Playback Expansion

As shown in FIG. 7B, the method 750 involves at block 752, determining by a first playback device that is a part of a first zone, that a second playback device has entered within a proximity of the first playback device; at block 754, determining that the second playback device is playing a media item as part of a second zone; and at block 756, based on the determination, (i) joining the second zone and (ii) beginning to play the media item in synchrony with the second playback device. The method 750 involves the first playback device expanding playback of the media item from the second playback device to the first playback device when the second playback device is placed within the proximity of the first playback device.

a. Determining That a Second Playback Device has Entered Within a Proximity of the First Playback Device At block 752, the method 750 involves determining by a first playback device that is a part of a first zone, that a second playback device has entered within a proximity of the first playback device. Referring to FIG. 5A for illustrative purposes, the first playback device may be the playback device 504, the first zone may be a living room zone, and the second playback device may be the playback device 502.

As shown, the playback device 504 may be a part of the living room zone, when the playback device 502 moved to location B, within a proximity of the playback device 504. In one example, the playback device 504 may be powered from an external power source while the playback device 502 may be powered from an internal battery.

With playback device 502 now at location B, the playback device 504 may determine that the playback device 502 has entered within the proximity of playback device 504. In one example, the playback device 504 may determine that the playback device 502 has entered within the proximity of the playback device 504 based on one or more proximity sensors on the playback device 504. The one or more proximity sensors may include one or more of a capacitive sensor, an inductive sensor, a laser sensor, a magnetic sensor, an infrared sensor, a photo-sensor, an acoustic sensor, and a wireless signal sensor, among other possibilities.

In one instance, a wireless signal sensor of the playback device 504 may detect a wireless signal emitted from a playback device with a signal strength that is now above a threshold value, indicating that the playback device has now entered within the proximity of the playback device 504. Based on the detection, the playback device 504 may parse the detected wireless signal to identify the playback device 502 as the source of the detected wireless signal and accordingly, as the playback device within the proximity of the playback device 504.

In another instance, a photo-sensor on the playback device 504 may detect that a playback device has entered within a proximity (i.e. photo-sensing range) of the playback device 504. The playback device 504, in response to the detection, may transmit to the detected playback device, a request for information identifying the detected playback device, and subsequently identify the playback device 502 as the detected playback device based on a received response to the request. Other examples for identifying the playback device 502 as the playback device that has entered within the proximity of the first playback device are also possible.

b. Determining That the Second Playback Device is Playing a Media Item as Part of a Second Zone At block 754, the method 750 involves determining that the second playback device is playing a media item as part of a second zone. Continuing with the example above, upon determining that the playback device 502 has entered within the proximity of the playback device 504, the playback device 504 may determine that that playback device 502 is playing a media item as a part of the balcony zone and is not a part of the living room zone.

In one example, the playback device 504 may determine that the playback device 502 is playing the media item as part of the balcony zone by transmitting to the playback device 502 a request for information associated with the playback device 502, and subsequently receive information from the playback device 502 indicating that the playback device 502 is playing the media item and is a part of the balcony zone.

In another example, the playback device 504 may determine that the playback device 502 is playing the media item as part of the balcony zone by transmitting to one or more playback devices in the media playback system 500 (including or excluding the playback device 504), a request for information associated with the playback device 502, and subsequently receive information from the one or more playback devices in the media playback system 500, information indicating that the playback device 502 is playing the media item as part of the balcony zone.

In yet another example, the playback device 502 may determine that the playback device 502 is playing the media item as part of the balcony zone by retrieving a locally stored state variable associated with the playback device 502. For instance, the playback device 504 (and one or more other playback devices in the media playback system 500) may maintain state variables associated with itself and other playback devices in the media playback system 500. A state variable may be updated for a corresponding playback device periodically and/or when a configuration and/or status of the corresponding playback device changes. For instance, a state variable corresponding to the playback device 502 may be updated when the playback device 502 began playing the media item as part of the balcony zone. As such, the playback device 504 may retrieve the locally stored state variable that is associated with the playback device 502 to determine that the playback device 502 is playing the media item as part of the balcony zone. Other examples are also possible.

As shown in FIG. 5A, the playback device 502 moved from location A to location B, within the proximity of the playback device 504. In one example, block 754 may be performed by the playback device 504 once the playback device 504 determines that the playback device 502 has entered within the proximity of the playback device 504. In another example, the playback device 504 may determine that the playback device 502 has been placed, and is not actively in transition, before performing block 754.

In one case, the playback device 504 may determine using the one or more proximity sensors on the playback device 504, whether the playback device 502 is still in transition. For instance, if the one or more proximity sensors detect a substantially consistent presence of the playback device 502 within the proximity of the playback device 504, the playback device 504 may determine that the playback device 502 has been placed and proceed to perform block 754. In another instance, if the one or more proximity sensors detect a substantially varying presence of the playback device 502 within the proximity of the playback device 504, the playback device 504 may determine that the playback device 502 has not been placed and may not proceed to perform block 754.

In another case, the playback device 504, prior to performing block 754, may transmit to the playback device 502 a request for information indicating whether the playback device 502 has been placed. The playback device 504 may then determine whether to proceed to perform block 754 based on a response from the playback device 502 indicating whether the playback device 502 has been placed. As indicated previously, the playback device 502 may include one or more movement sensors (i.e. accelerometers, among other possibilities) to determine whether the playback device 502 has been placed. Other examples are also possible.

c. Based on the Determination, (i) Joining the Second Zone and (ii) Begin to Play the Media Item in Synchrony with the Second Playback Device At block 756, the method 750 involves based on a determination, (i) join the second zone and (ii) begin to play the media item in synchrony with the second playback device. Continuing with the example above, the playback device 504 may join the balcony zone and begin playing the media item in synchrony with the playback device 502. In other words, the playback device 504 may join the balcony zone, and accordingly begin playing the media item as part of the balcony zone, which involves playing the media item in synchrony with the playback device 502. As indicated above, U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

In one example, if the playback device 504 proceeded to block 754 from block 752 without determining whether the playback device 502 has been placed, the playback device 504 may determine whether the playback device 502 has been placed prior to performing block 756.

In one example, the playback device 504 may begin playing the media item in synchrony with the playback device 502 at a volume level that the playback device 504 was previously playing media content. In another example, the playback device 504 may begin playing the media item in synchrony with the playback device 502 at a particular volume level determined based on a playback volume level of the playback device 502. In one case, if the playback device 504 is a same type of playback device as the playback device 502 (i.e. same model), the particular volume level may be the same as the volume level of the playback device 502. In another case, if the playback device 504 has a lower audio output power (i.e. lower wattage amplifier, among other possibilities), the particular volume level may be higher than the volume level of the playback device 502 to properly match the volume output of the playback device 502. Analogously, if the playback device 504 has a higher audio output power (i.e. higher wattage amplifier, among other possibilities), the particular volume level may be lower than the volume level of the playback device 502. Other cases are also possible.

In a further example, the playback device 504, when beginning to play the media item in synchrony with the playback device 502, may gradually increase a playback volume of the media item from a first playback volume to a second playback volume over a duration of time. In this example, the first playback volume may be a volume level of zero, and the second playback volume may be the particular playback volume determined based on the playback volume of the playback device 502, as discussed above. Examples of the duration of time may be anywhere between 3 to 15 seconds. In one case, the volume increase from the first playback volume to the second playback volume may be performed at a predetermined rate, such as 2 volume units per second. In this case, the duration of time may vary based on the difference between the first playback volume and the second playback volume. Other examples are also possible.

Once the playback device 504 has joined the balcony zone and begun playing the media item in synchrony with the playback device 502, the playback device 504 may provide an indication to any users or listeners in the playback environment that the playback device 504 is joining or has joined the living room zone. The indication may include one or more of a playback of an audio signal, a flashing of a light source on the playback device 504, and a vibration of the playback device 504, among other possibilities.

Referring to FIG. 5B, the playback device 502, after entering within the proximity of the playback device 504 and/or being placed at location B, in the living room zone, may be subsequently moved to location C in the dining room zone. In one example, the playback device 502 may be subsequently moved from the location B before the playback device 504 has completed a process of joining the balcony zone and/or beginning to play the media item in synchrony with the playback device 502. This may be the case when a user, who is moving the playback device 502 from the balcony to the dining room, on the way to the dining room, temporarily places the playback device 502 in the living room near the playback device 504 before eventually moving the playback device 502 to the dining room. The user may perhaps be dropping off an item from the balcony in the living room and/or picking up an item in the living room to also bring to the dining room when the playback device 502 is temporarily placed at location B. Whichever the case, the temporary placement of the playback device 502 in the living room near the playback device 504 may accordingly cause the playback device 504 to begin performing the method 750.

In this example, if the playback device 504, while in the process of joining the balcony zone and/or beginning to play the media item in synchrony with the playback device 502, determines that the playback device 502 is moving, the playback device 504 may responsively, abort joining the living room zone and cease beginning to play the media item. In one case, the process of joining the balcony zone and beginning to play the media item in synchrony with the playback device 502 may include the increasing of the playback volume of the media item by the playback device 504 to the particular playback volume determined based on the playback volume of the playback device 502, as discussed above. Other examples are also possible.

In one case, the playback device 504 may determine that the playback device 502 is moving if the one or more proximity sensors on the playback device 504 detect a substantially varying presence of the playback device 502 within the proximity of the playback device 504. In another case, the playback device 504 may determine that the playback device 502 is moving if the playback device 504 receives from the playback device 502, information indicating that the playback device 502 is moving. Other examples are also possible.

VIII. Additional Examples

In addition to those provided above, other examples are also possible. While the above examples provide mechanism for a playback device to discover and identify another playback device within a proximity, one having ordinary skill in the art will appreciate that variations of the provided mechanisms and other such mechanisms are also possible. In one example, communication between the one or more playback devices may occur over one or more communication protocols, including WI-FI®, BLUETOOTH®, or NFC, among other possibilities. As such, a manner in which one playback device discovers and identifies another playback device may vary depending on communication protocol(s) enabled and used for communication between two playback devices.

For instance, according to a WI-FI® protocol, each playback device may be assigned a unique media access control (MAC) address. As such, a playback device may be identified according to the associated MAC address of the playback device. In another instance, if a BLUETOOTH® protocol is enabled on two playback devices, the two playback devices may follow a pairing procedure to share information upon the two playback devices entering within a proximity of each other. In a further instance, if NFC is enabled on two playback devices, information may be shared between the two playback devices according to one or more NFC protocols. Different pairs of playback devices in the media playback system may communicate according to different protocols, and accordingly may discover and identify each other according to different mechanisms.

While the above examples generally refer to a playback device joining a zone of another playback device that is already playing a media item, one having ordinary skill in the art will appreciate that the playback device may be configured to automatically join the zone of the other playback device based on proximity, whether or not the other playback device is playing a media item. In one example, a first playback device that is being powered by an internal battery may be configured to automatically join the zone of a second playback that is being powered by an external source, regardless of which, if any of the two playback devices are playing any media content. Other scenarios and implementations within which a playback device may join the zone of another playback device based on proximity are also possible.

While the above examples generally refer to a playback device joining a zone of another playback device to play media content in synchrony with the other playback device as part of the same zone, one having ordinary skill in the art will appreciate that playback devices may play media content in synchrony as a consolidated player, as playback devices within the same zone, and as playback devices of different zones within a zone group, among other possibilities. As such, other scenarios and implementations within which playback of a media item may be expanded to a playback device that was not previously playing the media item are also possible. For instance, playback of a media item by a first playback device may be expanded to a second playback device with the second playback device joining a zone of the first playback device (as described), forming a new zone with the first playback device, forming a zone group including the zone of the first playback device and a zone of the second playback device, or without any zone modifications at all, among other possibilities.

While the above examples generally refer to a playback volume of a first playback device joining a zone as being based on a playback volume of a second playback device that is already playing a media item as a part of the zone and that is within a proximity of the first playback device, one having ordinary skill in the art will appreciate that the playback volume of the first playback device may be based on additional factors. For instance, if the zone includes a plurality of other playback devices in addition to the second playback device, the playback volume of the first playback device joining the zone may be based on any one or more of the playback devices in the zone. In another instance, playback volumes of the one or more playback devices already in the zone may also be modified in response to the joining of the first playback device.

While the above examples generally refer to a playback device automatically joining a zone of another playback device to play media content in synchrony with the other playback device as part of the same zone, one having ordinary skill in the art will appreciate that in some cases, a user of the media playback system may be prompted, such as via a controller interface for the media playback system, to allow or deny the joining of the zone by the playback device prior to the playback device joining the zone.

While the above examples generally refer to the playback device that is joining the zone as being the playback device that provides an indication that the playback device is joining the zone, one having ordinary skill in the art will appreciate that in some cases, one or more playback devices in the zone, one or more playback devices in the media playback system, or one or more controller devices within the zone, among other possibilities, may also provide indication that the playback device is joining the zone.

While the above examples provide mechanisms to abort joining of a zone by a playback device and cessation of the playback device beginning to play a media item in synchrony with a playback device in the zone, one having ordinary skill in the art will appreciate that other mechanisms for addressing temporary placements and/or enterings of playback device proximities are also possible. For instance, referring to the examples provided in sections IV.-VIII., each of methods 600, 650, 700, and 750 above may further include a function to determine that the playback device 502 has been at location B for a threshold duration of time before the methods 600, 650, 700, and 750, as described above, are performed.

Other examples are also possible.

IX. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:
 a processor; and
 memory having stored thereon instructions executable by the processor to cause the first playback device to perform functions comprising:
  joining a first zone comprising at least one additional playback device, wherein joining the first zone configures the first playback device to synchronize audio playback with the at least one additional playback device, and wherein while the first playback device is part of the first zone, the first playback device is configured to play back first media in synchrony with playback of the first media by the at least one additional playback device;
  while the first playback device is part of the first zone, identifying that a second playback device has entered a location that is within a given physical proximity of the first playback device;
  while the first playback device is part of the first zone, determining that playback by the second playback device is to be expanded from the second playback device;
  based on determining that the playback by the second playback device is to be expanded from the second playback device, determining to change a zone configuration of the first playback device from the first zone to a second zone that comprises the second playback device; and responsively, (i) joining the second zone, wherein joining the second zone configures the first playback device to synchronize audio playback with the second playback device, wherein while part of the second zone, the first playback device is configured to play back second media in synchrony with playback of the second media by the second playback device and (ii) initiating playback of the second media in synchrony with the second playback device.

2. The first playback device of claim 1, wherein determining that playback is to be expanded from the second playback device comprises:

determining that the second playback device is playing back a media item as part of the second zone, wherein the second zone is different from the first zone.

3. The first playback device of claim 2, wherein determining that the second playback device is playing the media item as part of the second zone comprises:

transmitting a request for information associated with the second playback device; and receiving data indicating that the second playback device is a part of the second zone.

4. The first playback device of claim 1, wherein determining that playback is to be expanded from the second playback device comprises determining that the first playback device is not presently playing back media.

5. The first playback device of claim 1, wherein determining that playback is to be expanded from the second playback device comprises determining that the second playback device has remained stationary at the location that is within a given physical proximity of the first playback device for a pre-determined duration of time.

6. The first playback device of claim 1, wherein initiating playback of media in synchrony with the second playback device comprises gradually increasing playback volume to the same playback volume as the second playback device.

7. The first playback device of claim 1, wherein the functions further comprise:

within a predetermined duration of time after joining the second zone, determining that the second playback device is moving; and responsively, (i) exiting the second zone and (i) ceasing playback of media in synchrony with the second playback device.

8. A method comprising:

joining, via a first playback device, a first zone comprising at least one additional playback device, wherein joining the first zone configures the first playback device to synchronize audio playback with the at least one additional playback device, and wherein while the first playback device is part of the first zone, the first playback device is configured to play back first media in synchrony with playback of the first media by the at least one additional playback device;

while the first playback device is part of the first zone, identifying, via the first playback device, that a second playback device has entered a location that is within a given physical proximity of the first playback device;

while the first playback device is part of the first zone, determining that playback by the second playback device is to be expanded from the second playback device;

based on determining that the playback by the second playback device is to be expanded from the second playback device, determining to change a zone configuration of the first playback device from the first zone to a second zone that comprises the second playback device; and responsively, (i) joining the second zone, wherein joining the second zone configures the first playback device to synchronize audio playback with the second playback device, wherein while part of the second zone, the first playback device is configured to play back second media in synchrony with playback of the second media by the second playback device and (ii) initiating playback of the second media in synchrony with the second playback device.

9. The method of claim 8, wherein determining that playback is to be expanded from the second playback device comprises:

determining that the second playback device is playing back a media item as part of the second zone, wherein the second zone is different from the first zone.

10. The method of claim 9, wherein determining that the second playback device is playing the media item as part of the second zone comprises:

transmitting a request for information associated with the second playback device; and receiving data indicating that the second playback device is a part of the second zone.

11. The method of claim 8, wherein determining that playback is to be expanded from the second playback device comprises determining that the first playback device is not presently playing back media.

12. The method of claim 8, wherein determining that playback is to be expanded from the second playback device comprises determining that the second playback device has remained stationary at the location that is within a given physical proximity of the first playback device for a pre-determined duration of time.

13. The method of claim 8, wherein initiating playback of media in synchrony with the second playback device comprises gradually increasing playback volume to the same playback volume as the second playback device.

14. The method of claim 8, wherein the method further comprises:

within a predetermined duration of time after joining the second zone, determining that the second playback device is moving; and responsively, (i) exiting the second zone and (i) ceasing playback of media in synchrony with the second playback device.

15. A tangible, non-transitory, computer-readable media having instructions encoded therein, wherein the instructions, when executed by one or more processors, cause a first playback device to perform a method comprising:

joining a first zone comprising at least one additional playback device, wherein joining the first zone configures the first playback device to synchronize audio playback with the at least one additional playback device, and wherein while the first playback device is part of the first zone, the first playback device is configured to play back first media in synchrony with playback of the first media by the at least one additional playback device;

while the first playback device is part of the first zone, identifying that a second playback device has entered a location that is within a given physical proximity of the first playback device;

while the first playback device is part of the first zone, determining that playback by the second playback device is to be expanded from the second playback device;

based on determining that the playback by the second playback device is to be expanded from the second playback device, determining to change a zone configuration of the first playback device from the first zone to a second zone that comprises the second playback device; and responsively, (i) joining the second zone, wherein joining the second zone configures the first playback device to synchronize audio playback with the second playback device, wherein while part of the second zone, the first playback device is configured to play back second media in synchrony with playback of the second media by the second playback device and (ii) initiating playback of the second media in synchrony with the second playback device.

16. The non-transitory, computer-readable media of claim 15, wherein determining that playback is to be expanded from the second playback device comprises:

determining that the second playback device is playing back a media item as part of the second zone, wherein the second zone is different from the first zone.

17. The non-transitory, computer-readable media of claim 16, wherein determining that the second playback device is playing the media item as part of the second zone comprises:

transmitting a request for information associated with the second playback device; and receiving data indicating that the second playback device is a part of the second zone.

18. The non-transitory, computer-readable media of claim 15, wherein determining that playback is to be expanded from the second playback device comprises determining that the first playback device is not presently playing back media.

19. The non-transitory, computer-readable media of claim 15, wherein determining that playback is to be expanded from the second playback device comprises determining that the second playback device has remained stationary at the location that is within a given physical proximity of the first playback device for a pre-determined duration of time.

20. The non-transitory, computer-readable media of claim 15, wherein initiating playback of media in synchrony with the second playback device comprises gradually increasing playback volume to the same playback volume as the second playback device.

21. The first playback device of claim 1, wherein the functions further comprise:

in response to joining the second zone, updating a state variable stored on the first playback device to indicate that the first playback device is part of the second zone.

* * * * *